(12) United States Patent
Arvanitakis et al.

(10) Patent No.: US 11,130,908 B2
(45) Date of Patent: Sep. 28, 2021

(54) COATED PROPPANTS AND NANITES AND METHODS OF MAKING AND USE OF COATED PROPPANTS AND NANITES

(71) Applicant: GROUP HOLDINGS, LLC, Sioux Falls, SD (US)

(72) Inventors: Nicholas Arvanitakis, Phoenix, AZ (US); Chrisanthos Arvanitakis, Phoenix, AZ (US); Diego Rosado, Phoenix, AZ (US)

(73) Assignee: Group Holdings, LLC, Sioux Falls, SD (US)

( * ) Notice: Subject to any disclaimer, the term of this patent is extended or adjusted under 35 U.S.C. 154(b) by 0 days.

(21) Appl. No.: 16/267,059

(22) Filed: Feb. 4, 2019

(65) Prior Publication Data
US 2019/0169490 A1 Jun. 6, 2019

Related U.S. Application Data

(63) Continuation of application No. 14/824,960, filed on Aug. 12, 2015, now Pat. No. 10,196,559.

(60) Provisional application No. 62/203,839, filed on Aug. 11, 2015, provisional application No. 62/036,470, filed on Aug. 12, 2014, provisional application No. 62/036,466, filed on Aug. 12, 2014, provisional application No. 62/036,461, filed on Aug. 12, 2014.

(51) Int. Cl.
*C09K 8/80* (2006.01)
*E21B 43/26* (2006.01)
*E21B 43/267* (2006.01)
*C09K 8/60* (2006.01)

(52) U.S. Cl.
CPC .............. *C09K 8/805* (2013.01); *E21B 43/26* (2013.01); *E21B 43/267* (2013.01); *C09K 8/605* (2013.01); *C09K 2208/08* (2013.01); *C09K 2208/10* (2013.01)

(58) Field of Classification Search
None
See application file for complete search history.

(56) References Cited

U.S. PATENT DOCUMENTS

| | | | | |
|---|---|---|---|---|
| 2010/0147515 A1* | 6/2010 | Hughes | ................. | C09K 8/685 |
| | | | | 166/271 |
| 2010/0267593 A1* | 10/2010 | Zhang | ................... | C09K 8/575 |
| | | | | 507/219 |
| 2012/0073821 A1* | 3/2012 | Holtsclaw | ............. | C09K 8/035 |
| | | | | 166/310 |
| 2016/0251571 A1* | 9/2016 | Agrawal | ............. | A61Q 17/005 |
| | | | | 507/219 |

* cited by examiner

*Primary Examiner* — Jeffrey D Washville
(74) *Attorney, Agent, or Firm* — Venjuris PC

(57) ABSTRACT

Methods and compositions applied to proppants and/or nanites in order to reduce the microorganisms in fracking wells are disclosed.

6 Claims, No Drawings

COATED PROPPANTS AND NANITES AND METHODS OF MAKING AND USE OF COATED PROPPANTS AND NANITES

CROSS-REFERENCES TO RELATED APPLICATIONS

The present application claims priority to the following U.S. provisional patent applications, all of which are incorporated herein by reference in their entireties:

Ser. No. 62/036,461, entitled "Coated Proppant And Method Of Making And Use Of Coated Proppant," filed on Aug. 12, 2014;

Ser. No. 62/036,466, entitled "Coated Proppant And Method Of Making And Use Of Coated Proppant," filed on Aug. 12, 2014;

Ser. No. 62/036,470, entitled "Coated Nanites And Method Of Making And Use Of Coated Nanites," filed on Aug. 12, 2014; and Ser. No. 62/203,839, entitled "Coated Proppant And Nanites And Method Of Making And Use Of Coated Proppant And Nanites," filed on Aug. 11, 2015.

FIELD

Decreasing the number of microorganisms in Fracking Wells by coating proppants with Quaternary ammonium organosilanes. By forming a bonded anti-microbial coating all around the proppant the use of biocides during the hydraulic fracking process is dramatically reduced. A proppant is a solid material, typically sand, man-made ceramic materials, aluminium oxide, zirconium dioxide, or sintered bauxite designed to keep an induced hydraulic fracture open, during or following a fracturing treatment. Hydraulic fracturing proppants hold open the small fractures once the deep rock achieves geologic equilibrium.

The coated proppant reduces and eliminates microbial growth within the fracking wells, without the use of harmful biocides. The coated proppant does not allow micro-organisms to grow, which increases flow rates. With coated proppant, flow rates stay efficient and steady during the fracking process, making extraction quicker and more cost effective. Additionally, with coated proppant, the amount of biocides is dramatically decreased during the process reducing the cost of biocides and storage of biocides. Another great benefit of the coated proppant is to improve the safety of well sites for workers. Environmental risks are also decreased, as the number of biocides are reduced.

Proppant coated with quaternary organosilane to form an antimicrobial coating, preferably bonded, on the proppant. The proppant may be any type of material used in hydraulic fracture, included but not limited to, ceramics, silica, or other materials. These antimicrobial coated proppants may be used in oil and gas wells that utilize hydraulic fracture to allow or enhance extraction.

Decreasing the number of microorganisms in Fracking Wells by coating nanites or nanofibers with Quaternary ammonium organosilanes, then taking the coated nanites or nanofibers and mixing it with (or suspending it in) fracking fluids. By forming a bonded anti-microbial coating all around the nanites or nanofibers, the use of biocides during the hydraulic fracking process is dramatically reduced. A nanite or nanofibers are particles defined as a small objects that behave as a whole unit with respect to its transport and properties. Particles are further classified according to diameter. Coarse particles cover a range between 2,500 and 10,000 nanometers. Fine particles are sized between 100 and 2,500 nanometers. Ultrafine particles, or nanoparticles, are between 1 and 100 nanometers in size.

Benefits of Invention

The coated nanites or proppant mixed in fracking fluids reduces and eliminates microbial growth within the fracking wells, without the use of harmful biocides. The coated nanites or proppants do not allow micro-organisms to grow, which increases flow rates. With coated nanites or proppants, flow rates stay efficient and steady during the fracking process, making extraction quicker and more cost effective. Additionally, with coated nanites and proppants, the amount of biocides are dramatically decreased during the process reducing the cost of biocides and storage of biocides. Another great benefit of the coated nanites and proppants are the improvements to the safety of well sites for workers. Environmental risks are also decreased as the number of biocides used is reduced.

In addition, coated proppant reduces and eliminates microbial growth within fracking wells, having a positive effect on a wells total performance. Examples of where coated proppant have proven to be effective but not limited to are:

Reducing or eliminating total SRB's (sulfur reducing bacteria).

Reduces total MIC's (Microorganism influenced corrosion)

Reduces total SSC's (Sulfide stress cracking)

Decreases FeS scale issues

Decrease well souring due to increase amounts of bacteria.

Increase flow rates by decreasing biofilm build up around and throughout proppant in fracking fissures.

Decrease chances of well abandonment due to bacteria.

Nanites and proppants coated with quaternary organosilane to form an antimicrobial coating, preferably bonded, on the nanites and proppants. The nanites and proppants may be any type of material used in hydraulic fracture, included but not limited to, metal, ceramics, carbon fibers, or other materials. These antimicrobial coated nanites and proppants may be used in oil and gas wells that utilize hydraulic fracture to allow or enhance extraction.

BACKGROUND

The references found in US Patent Publication No. 2005/00008613 and U.S. Pat. No. 6,613,755 do not disclose the invention of coated proppants or their uses. Other relevant US patents and US patent publications are: U.S. Pat. Nos. 8,728,540 B2, 8,956,665 B2, 8,754,146 B2, US Patent Publ. No. US 2011/0271873 A1, U.S. Pat. Nos. 4,394,378, 4,842, 766, 6,994,890 B, 6,221,944 B1, US Patent Publ. No. US 2007/0163964 A1, and US Patent Publ. No. US 2009/0074971 A1 and US Patent Publ. No. 2005/00008613 and U.S. Pat. No. 6,613,755 all of the foregoing patents and patent publications are fully incorporated herein in their entireties. Additional patents that may be of background interest are: European Patent Application No. EP 2 308 308 A1 and PCT Publication No. WO 2011/020586 A2, each of which is incorporated herein in their entities.

DETAILED DESCRIPTION

In a preferred example of the invention, commercial quaternary ammonium organosilanes are available as:

Dow Corning 5700, Requat, ODTA, TDTA

Company's that make it are Aegis Environmental Management Inc., Sanitize Inc., Gelest Inc., and Wright Chemical Corp.

1. (3-(trimethoxysilyl)-propyldimethyloctadecyl ammonium chloride—42% active in methanol 2. Octadecyldimethyl(3-trimethoxysilylpropyl) ammonium chloride—(Cat No. 5106620.0) 60% active in methanol
3. Tetradecyldimethyl(3-tri methoxysilylpropyl) ammonium chloride—(Cat No. SIT7090.0) 50% solution in methanol
4. Didecylmethyl(3-trimethoxysilylpropyl) ammonium chloride—(Cat No. SID3392.0) 42% solution in methanol They are often applied from solvent solutions such as lower alcohols.

The present invention will provide the methods and compositions which were applied to proppants and/or nanites in order to reduce the microorganisms in fracking wells.

Proppants

Example #1

A Mixture of 67.5 grams Requat to a stirred solution of 3.375 kg deionized water, and 3 grams of 3-aminopropyltrimethoxysilane.

The Mixture was poured into a bucket and 14 lbs of Ceramic Proppant were submerged in the mixture solution for approximately 10 min.

The proppant was then removed and allowed to air dry, preferably, until 100% dry.

Example #2

A Mixture of 8 parts Requat to 100 parts isopropanol

The mixture was poured into a bucket then 14 lbs of Ceramic Proppant were submerged in the mixture solution for approximately 10 min.

The proppant was then removed and allowed to air dry, preferably, until 100% dry.

Preferred Application Method

1. Wash material to be coated to clean any residual dust during manufacturing process
2. Dry material, preferably to 0%
3. Soak material in quaternary ammonium organosilane
4. Air dry for 24 hours and then heat 2 hours at 110 degree Celsius in a forced air oven to cure the quaternary ammonium organosilane reagent to the proppant. This then forms a quaternary ammonium orgasnosilane coating.

It is believed that the quaternary ammonium organosilanes amounts may be varied between 0.1 and 20 percent in solution, but preferably, the quaternary ammonium organosilanes is between 0.5 percent and 5 percent. In a most preferred embodiment, water is greater than 98%.

In another preferred embodiment, an alcohol, such as isopropyl alcohol, replaces the water.

Other methods of applications are available; for example, incipient wetness technique and wet impregnation.

It is believed that pretreatement of the proppant by washing with water, especially deionized water, and heating of the proppant in a drying atmosphere; for example calcination or heating in nitrogen or heating other inert atmosphere (e.g. helium or argon) may be preferable.

Experimental

According to tests of a coated proppant inoculated with $10^7$/ml of bacteria containing sulfate reducing bacteria (SRB) and both acid producing and non-acid producing, general aerobic bacteria under simulated well conditions (300° F. for 4 hours followed by 5,000 psi for 1 hour) the following was observed:

After 24 days the sample eliminated the sulfate containing bacteria.

Nanites

Example #1

A Mixture of 67.5 grams Requat to a stirred solution of 3.375 kg deionized water, and 3 grams of 3-aminopropyltrimethoxysilane.

The Mixture was poured into a bucket and 14 lbs of Nanites or nano-fibers were submerged in the mixture solution for approximately 10 min.

The nanites or nano fibers was then removed and allowed to air dry, preferably, until 100% dry.

Example #2

A Mixture of 8 parts Requat to 100 parts isopropanol

The mixture was poured into a bucket then 14 lbs of Ceramic Nanites or nano-fibers were submerged in the mixture solution for approximately 10 min.

The nanites or nano-fibers was then removed and allowed to air dry, preferably, until 100% dry.

Preferred Application Method

1. Wash material to be coated to clean any residual dust during manufacturing process
2. Dry material, preferably, to 0%
3. Soak material in quaternary ammonium organosilane
4. Air dry for 24 hours and then heat 2 hours at 110 degree Celsius in a forced air oven to cure the quaternary ammonium organosilane reagent to the proppant. This then forms a quaternary ammonium orgasnosilane coating.
5. Then mix in to fracking fluid and inject into well It is believed that the quaternary ammonium organosilanes amounts may be varied between 0.1 and 20 percent in solution, but preferably, the quaternary ammonium organosilanes is between 0.5 percent and 5 percent. In a most preferred embodiment, water is greater than 98%.

In another preferred embodiment, an alcohol, such as isopropyl alcohol, replaces the water.

Other methods of applications are available; for example, incipient wetness technique and wet impregnation.

It is believed that pretreatement of the nanites by washing with water, especially deionized water, and heating of the nanites in a drying atmosphere; for example calcination or heating in nitrogen or heating other inert atmosphere (e.g. helium or argon) may be preferable.

What is claimed is:

1. A method for reducing microbial growth using a coated material comprising:
   Creating a material selected from the group consisting of proppants and nanites, and
   a solubilized quaternary ammonium organosilane,
   wherein the material is mixed with the solubilized quaternary organosilane and dried creating the coated material capable of eliminating sulfur containing bacterial at temperatures at or above 300° F. and at or pressures greater than 5000 psi. for at least 24 days, and
   mixing the created material with fracking fluids for use within fracking wells.

2. The method for reducing microbial growth using a coated material claim 1 wherein the proppants and nanites are selected from metals, ceramics, carbon fibers, silica and mixtures thereof.

3. The method for reducing microbial growth using a coated material claim 1 wherein the solubilized quaternary ammonium organosilane is selected from (3-(trimethoxysilyl)-propyldimethyloctadecyl ammonium chloride, Octadecyldimethyl(3-trimethoxysilylpropyl) ammonium chloride, Tetradecyldimethyl(3-tri methoxysilylpropyl) ammonium chloride, Didecylmethyl(3-trimethoxysilylpropyl) ammonium chloride and mixtures thereof.

4. The method for reducing microbial growth using a coated material claim 1 wherein the material are course particles having a diameter range between 2,500 and 10,000 nanometers.

5. The method for reducing microbial growth using a coated material claim 1 wherein the material are course particles having a diameter range between 100 and 2,500 nanometers.

6. The method for reducing microbial growth using a coated material claim 1 wherein the material are course particles having a diameter range between 1 and 100 nanometers.

\* \* \* \* \*